(12) United States Patent
Irwin et al.

(10) Patent No.: US 6,998,753 B2
(45) Date of Patent: Feb. 14, 2006

(54) MULTILAYER CO-EXTRUSION ROTOR SLOT ARMOR AND SYSTEM FOR MAKING THE SAME

(75) Inventors: Patricia Chapman Irwin, Altamont, NY (US); John Lester Maxam, Saratoga Springs, NY (US); Alison Palmatier, Porter Corners, NY (US); Hsin-Pang Wang, Rexford, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/604,055

(22) Filed: Jun. 24, 2003

(65) Prior Publication Data

US 2004/0263021 A1     Dec. 30, 2004

(51) Int. Cl.
*H02K 3/34*     (2006.01)
*B32B 27/34*     (2006.01)

(52) U.S. Cl. .................... 310/215; 442/292; 428/480
(58) Field of Classification Search .................. 310/43, 310/215; 442/292, 394; 428/421, 422, 473.5, 428/480, 458, 626
See application file for complete search history.

(56) References Cited

U.S. PATENT DOCUMENTS

| | | | |
|---|---|---|---|
| 3,788,513 A | 1/1974 | Racz | |
| 3,974,314 A | 8/1976 | Fuchs | |
| 4,162,340 A | 7/1979 | Fuchs | |
| 4,174,935 A | 11/1979 | Driskill | |
| 4,473,765 A | 9/1984 | Butman, Jr. et al. | |
| 4,560,896 A | 12/1985 | Vogt et al. | |
| 4,582,749 A | 4/1986 | Boulter et al. | |
| 4,667,125 A | 5/1987 | Kaminski et al. | |
| 4,772,653 A | 9/1988 | McKenna | |
| 4,877,682 A | 10/1989 | Sauers et al. | |
| 4,922,165 A * | 5/1990 | Crawford et al. | 310/215 |
| 5,065,064 A | 11/1991 | Kaminski | |
| 5,120,825 A * | 6/1992 | Vora et al. | 528/350 |
| 5,329,197 A | 7/1994 | Kudlacik | |
| 5,608,637 A | 3/1997 | Wang et al. | |
| 5,926,393 A | 7/1999 | Wang et al. | |
| 6,054,224 A * | 4/2000 | Nagai et al. | 428/480 |
| 6,246,918 B1 | 6/2001 | Wang et al. | |
| 6,437,031 B1 | 8/2002 | Lensvelt et al. | |
| 2005/0012424 A1 | 1/2005 | Irwin et al. | |

FOREIGN PATENT DOCUMENTS

JP     62-171427     *     7/1987     .................. 310/215

* cited by examiner

*Primary Examiner*—Tran Nguyen
(74) *Attorney, Agent, or Firm*—Nixon & Vanderhye P.C.

(57) ABSTRACT

A slot armor component for use in a rotor of a dynamo-electric machine comprises a plurality of profile co-extruded polymer layers. The composite cross-section of the profile co-extruded layers may include a first leg portion and a second leg portion disposed at an angle to the first leg portion. The plurality of co-extruded polymer layers may include a glass-filled polymer layer arranged between two unfilled polymer layers such as a glass-filled Ultem layer having a glass-fill concentration equal to or less than 30% arranged between two unfilled Ultem layers or a glass-filled polyetheretherketone (PEEK) layer having a glass-fill concentration equal to or less than 30% arranged between two unfilled PEEK layers.

10 Claims, 11 Drawing Sheets

MULTILAYER CO-EXTRUSION ROTOR SLOT ARMOR AND SYSTEM FOR MAKING THE SAME

CROSS REFERENCE TO RELATED APPLICATIONS

This application is related to commonly assigned U.S. application Ser. No. 10/604,054 entitled "Rotor Slot Insulation for Turbine-Generators and Method and System of Manufacture", filed concurrently herewith and naming Irwin et al. as inventors, the content of which is incorporated herein by reference.

BACKGROUND OF INVENTION

This invention relates to a material having a plurality of profile co-extruded layers and a profile co-extrusion system for making the same.

Dynamo-electric machines such as power generators include a rotor mounted within a stator. The rotor is an electromagnet that includes field coils typically made of copper or aluminum. A body of the rotor, typically made of steel, includes multiple axial slots. The field coils are arranged within these axial slots and produce a magnetic flux pattern when supplied with electrical current. A turbine (e.g., a gas or steam turbine) rotates the rotor including the field coils so that the magnetic flux pattern interacts with windings of the stator to generate electrical power.

The field coils must be electrically and mechanically isolated from the rotor body via rotor slot insulation. This insulation is designed to withstand the electrical, mechanical and thermal forces induced during normal operation of the dynamo-electric machine for twenty years or more. The rotor slot insulation often includes the following multiple parts:slot armor and a sub-slot cover. These parts serve to position and protect the field coils from electrical contact with the rotor body. Specifically, the slot armor insulates the coil's sides. The slot armor also provides electrical creepage distance at the radially inner (bottom) portion of the field coils and the radially outer (top) portion of the field coils. The sub-slot covers provide additional insulation and creepage distance between the radially inner portion of the field coils and the rotor body.

Various shapes and configurations of rotor slot insulation are known. For example, U.S. Pat. No. 4,162,340 to Fuchs discloses rotor slot insulation having an L-shaped profile or a U-shaped profile of laminated and compressed substances. A partial area of the rotor slot insulation such as the shorter leg (i.e., foot) of an L-shaped profile or the base of a U-shaped profile is thickened. U.S. Pat. No. 5,065,064 to Kaminski discloses rotor slot insulation which eliminates the need for sub-slot covers through the use of rotor slot armors having Z-shaped profiles. As yet another example, U.S. Pat. No. 4,560,896 to Vogt et al. discloses a composite slot armor and sub-slot cover having a one-piece, integrally molded construction.

There are two manufacturing processes which are commonly used to produce rotor slot armor for large turbine-generators. One process entails an autoclave process which involves producing a laminated composite armor comprising aramid paper (e.g., Nomexâ□), polyimide film (e.g., Kaptonâ□), woven glass fabric, and epoxy. The other process utilizes a compression-step-molding process using similar materials. U.S. Pat. No. 3,974,314 to Fuchs, U.S. Pat. No. 4,473,765 to Butman, Jr. et al., and U.S. Pat. No. 4,582,749 to Boulter et al. disclose further examples of various materials used to produce rotor slot armor.

In addition to these two processes, an extrusion die system comprising a first die for extruding a material to form a first layer and a second die for applying one capping layer onto the first layer is known. For example, a die system for extruding a low temperature polymer (i.e., polymer having a low melting temperature (Tg<200Â° C.) onto another low temperature polymer for forming vinyl house siding is known.

The current processes for manufacturing rotor slot armor are laborious. Also, expensive materials and equipment are needed. The current processes are difficult to control and often produce high scrap rates and/or inconsistent product quality. The current processes also impose limitations on the design of the cross-sectional shapes of armor that may be produced. Furthermore, composite laminate slot armor produced using these manufacturing processes may not possess the mechanical properties that make it easy and/or effective to assemble into the rotor body. Also, interfaces of the adjacent laminate layers of the slot armor may form weak joints which may have a low dielectric breakage strength and a low mechanical strength. The slot armor formed by laminated layers may thus break rather easily.

Accordingly, there remains a need for a system and process for manufacturing rotor slot armor which is relatively inexpensive and which can accommodate a large variety of shapes and thicknesses. There also remains a need for a rotor slot armor material which exhibits long life and other beneficial mechanical properties such as high flexural modulus, flexual strength, angular strength, electrical creepage, and dielectric strength as well as other properties such as reduced crack propagation, low moisture absorption and improved solvent resistance for reducing electrical failures due to chemical contamination.

SUMMARY OF INVENTION

In one aspect of the present invention, a slot armor component for use in a rotor of a dynamo-electric machine comprises a plurality of profile co-extruded polymer layers. A composite cross-section of the profile co-extruded layers may include a first leg portion and a second leg portion disposed at an angle to the first leg portion, the second leg portion being shorter and thicker than the first leg portion. Alternatively, a composite cross-section of the profile co-extruded layers may include a first leg portion and a second leg portion disposed at an angle to the first leg portion, the first and second leg portions having a uniform thickness.

The plurality of profile co-extruded polymer layers may include a first polymer layer having a first glass-fill concentration and a second polymer layer arranged on one side of the first polymer layer having a second glass-fill concentration which is lower than the first glass-fill concentration. The plurality of profile co-extruded layers may further include a third polymer layer having a third glass-fill concentration which is lower than the first glass-fill concentration, the third polymer layer being arranged on the opposite side of the first polymer layer on which the second polymer layer is arranged.

The plurality of profile co-extruded polymer layers may include a glass-filled polymer layer arranged between two unfilled polymer layers such as (i) a glass-filled Ultem layer having a glass-fill concentration equal to or less than 30% arranged between two unfilled Ultem layers, or (ii) a glass-filled PEEK layer having a glass-fill concentration equal to or less than 30% arranged between two unfilled unfilled PEEK layers.

The plurality of profile co-extruded polymer layers may include a first polymer layer having a non-uniform thickness and a second polymer layer having a uniform thickness. The plurality of profile co-extruded polymer layers may further include a third polymer layer, the third polymer layer having a uniform thickness, and the first polymer layer being arranged between the second and third polymer layers.

In another aspect of the invention, a composite material comprises a plurality of profile co-extruded high temperature polymer layers. The composite material may include a first high temperature polymer layer having a first glass-fill concentration and a second high temperature polymer layer arranged on one side of the first high temperature polymer layer having a second glass-fill concentration which is lower than the first glass-fill concentration. The composite material further may include a third high temperature polymer layer having a third glass-fill concentration which is lower than the first glass-fill concentration, the third high temperature polymer layer being arranged on the opposite side of the first high temperature polymer layer on which the second high temperature polymer layer is arranged. The plurality of profile co-extruded high temperature polymer layers may include a glass-filled high temperature polymer layer arranged between two unfilled high temperature polymer layers such as (i) a glass-filled Ultem layer having a glass-fill concentration equal to or less than 30% arranged between two unfilled Ultem layers, or (ii) a glass-filled PEEK layer having a glass-fill concentration equal to or less than 30% arranged between two unfilled PEEK layers. The plurality of profile co-extruded high temperature polymer layers may include a first high temperature polymer layer having a non-uniform thickness and second high temperature polymer layer having a uniform thickness. The plurality of profile co-extruded high temperature polymer layers may further include a third high temperature polymer layer having a uniform thickness, the first high temperature polymer layer being arranged between the second and third high temperature polymer layers.

In another aspect of the invention, a profile co-extrusion system comprises: a first extruder for receiving and melting a first material, a first profile extrusion die operatively coupled to the first extruder for receiving the first material melted by the first extruder and providing a first profile extruded layer, a second extruder for receiving and melting a second material, a second profile extrusion die operatively coupled to the second extruder for receiving the second material melted by the second extruder and providing a second profile extruded layer onto one side of the first profile extruded layer, a third extruder for receiving and melting a third material, a third profile extrusion die operatively coupled to the third extruder for receiving the third material melted by the third extruder and providing a third profile extruded layer onto a side of the first profile extruded layer which is opposite to the side on which the second profile extruded layer is provided, and a calibrator for receiving and cooling the first, second and third profile extruded layers. The first profile extrusion die may comprise a plate having a first slot and a second slot for passing the first material therethrough and a mandrel inserted into the second slot of the plate for restricting a flow rate of the material passing through the second slot. The second and third profile extrusion dies may receive the first profile extruded layer at a first flow rate and the second and third profile extrusion dies may each have a land having a length so that the respective flow rates of the second and third profile extruded layers onto the first profile extruded layer match the first flow rate.

DETAILED DESCRIPTION

Figure 1:
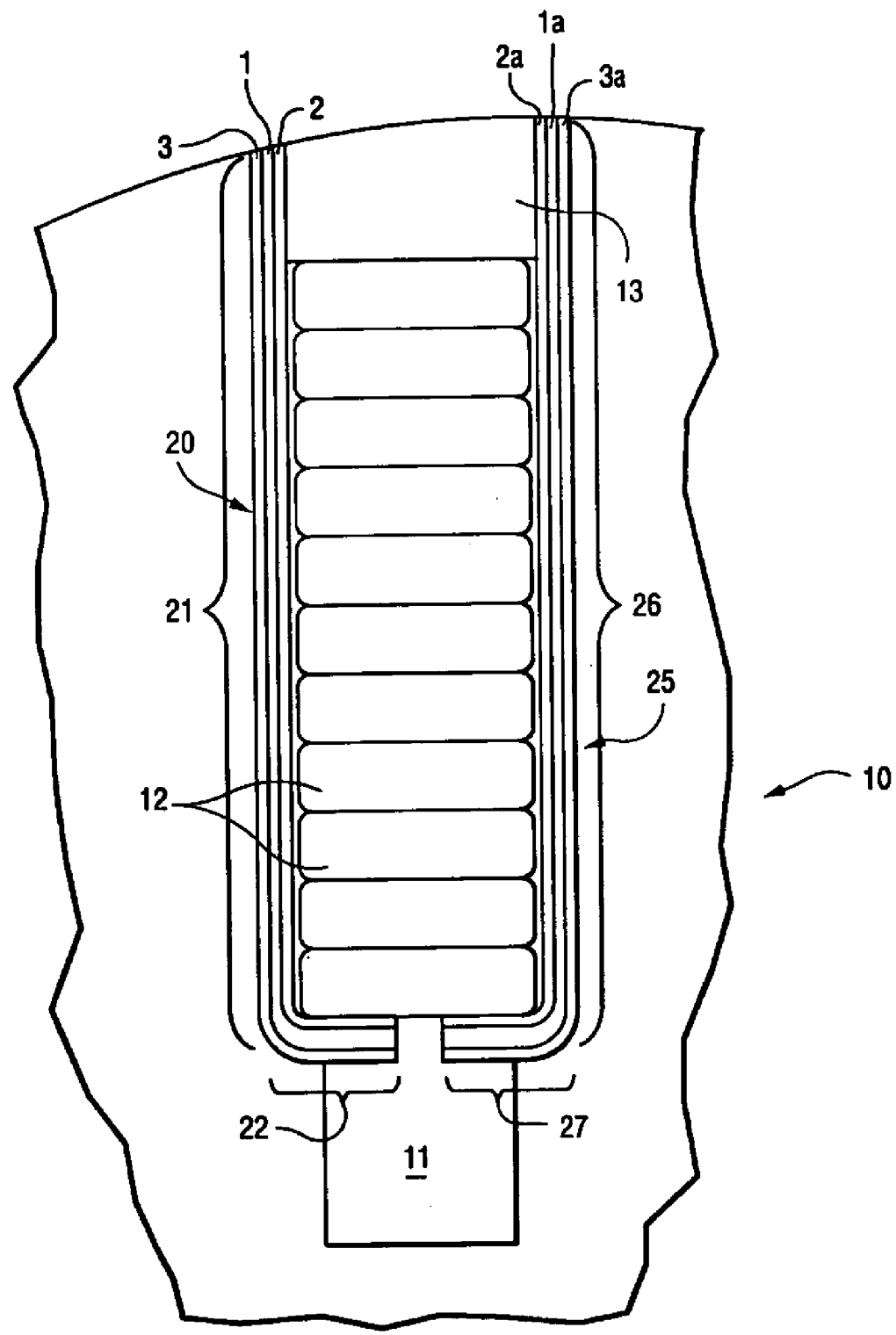
FIG. 1 is a partial cross-sectional view of a rotor of a dynamo-electric machine having rotor slot armor components according to an exemplary embodiment of the present invention.

FIG. 1 illustrates a partial cross-sectional view of a rotor 10 of a dynamo-electric machine in accordance with an exemplary embodiment of the present invention. Rotor 10 includes a plurality of axial slots 11, one of which is illustrated. Each of the axial slots 11 receives field coils 12 which are utilized to create a flux magnetic field. This flux magnetic field interacts with stator windings (not shown) of the dynamo-electric machine upon the rotation of rotor 10 to generate electric power.

Rotor slot armor mechanically and electrically isolates field coils 12 from the body of rotor 10. The rotor slot armor includes rotor slot armor components 20 and 25. Rotor slot armor component 20 includes long leg portion 21 and short leg portion 22 disposed perpendicularly to long leg portion 21. Rotor slot armor component 25 includes long leg portion 26 and short leg portion 27 disposed perpendicularly to long leg portion 26. Long leg portions 21 and 26 of respective rotor slot armor components 20 and 25 provide insulation to opposing sides of field coils 12 to withstand electrical, mechanical and thermal forces induced during operation of rotor 10. Short leg portions 22 and 27 of respective rotor slot armor components 20 and 25 extend adjacent to a radially innermost one of field coils 12. Creepage block 13 is arranged within slot 11 to insulate the radially outermost one of field coils 12 and resist the radially outward forces exerted on field coils 12 when rotor 10 is in operation. As can be seen in FIG. 1, no sub-slot cover is necessary in this exemplary embodiment of the present invention.

Figure 2:
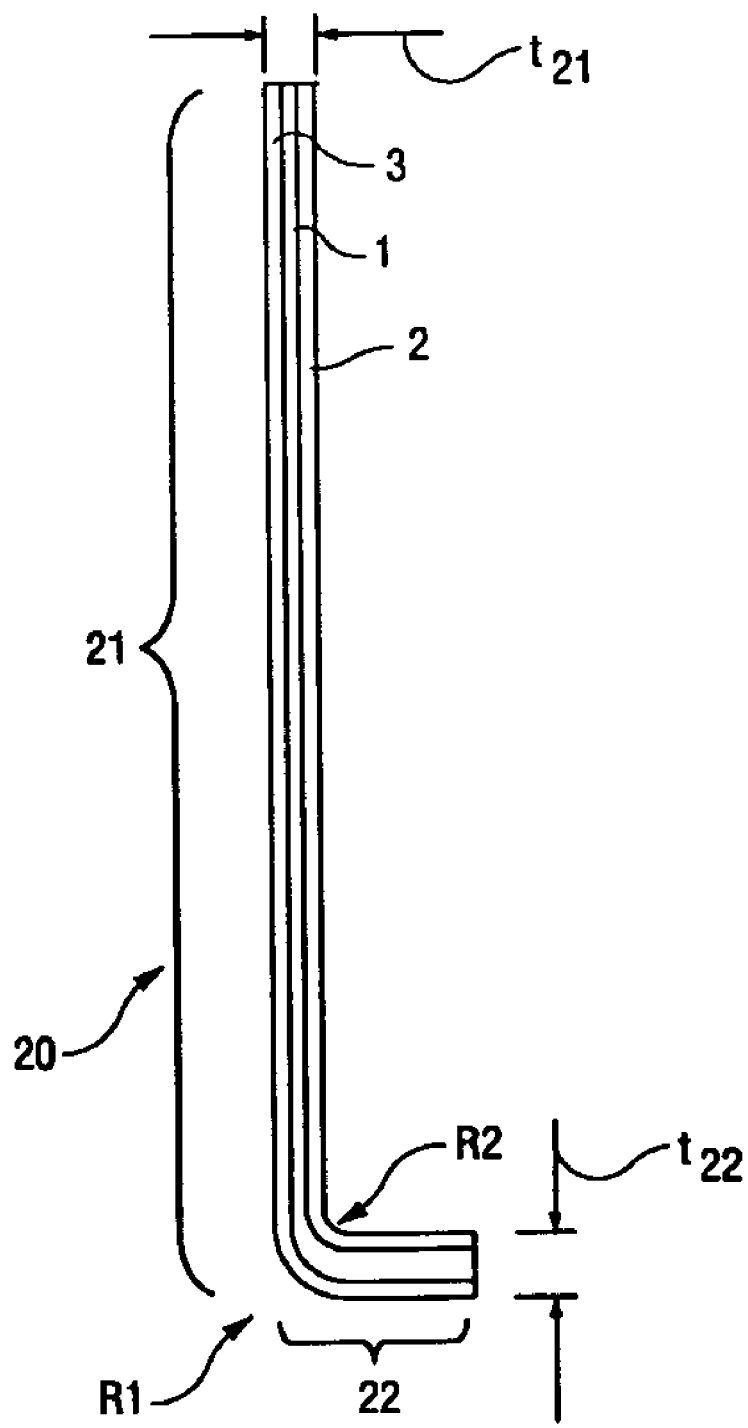
FIG. 2 is a side view of a rotor slot armor component in accordance with an exemplary embodiment of the present invention.
Figure 3:
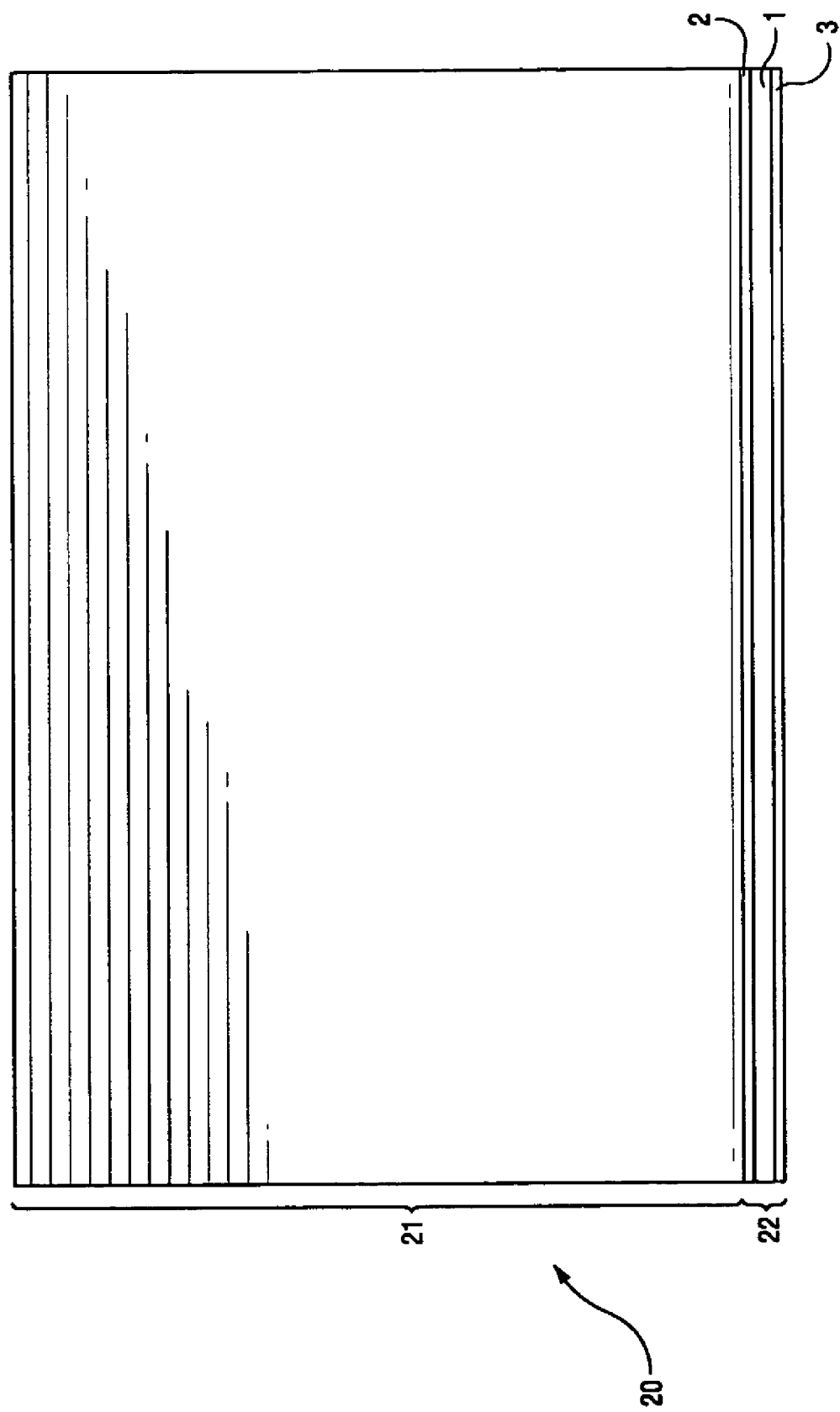
FIG. 3 is a front view of the rotor slot armor component illustrated in FIG. 2.
Figure 4:
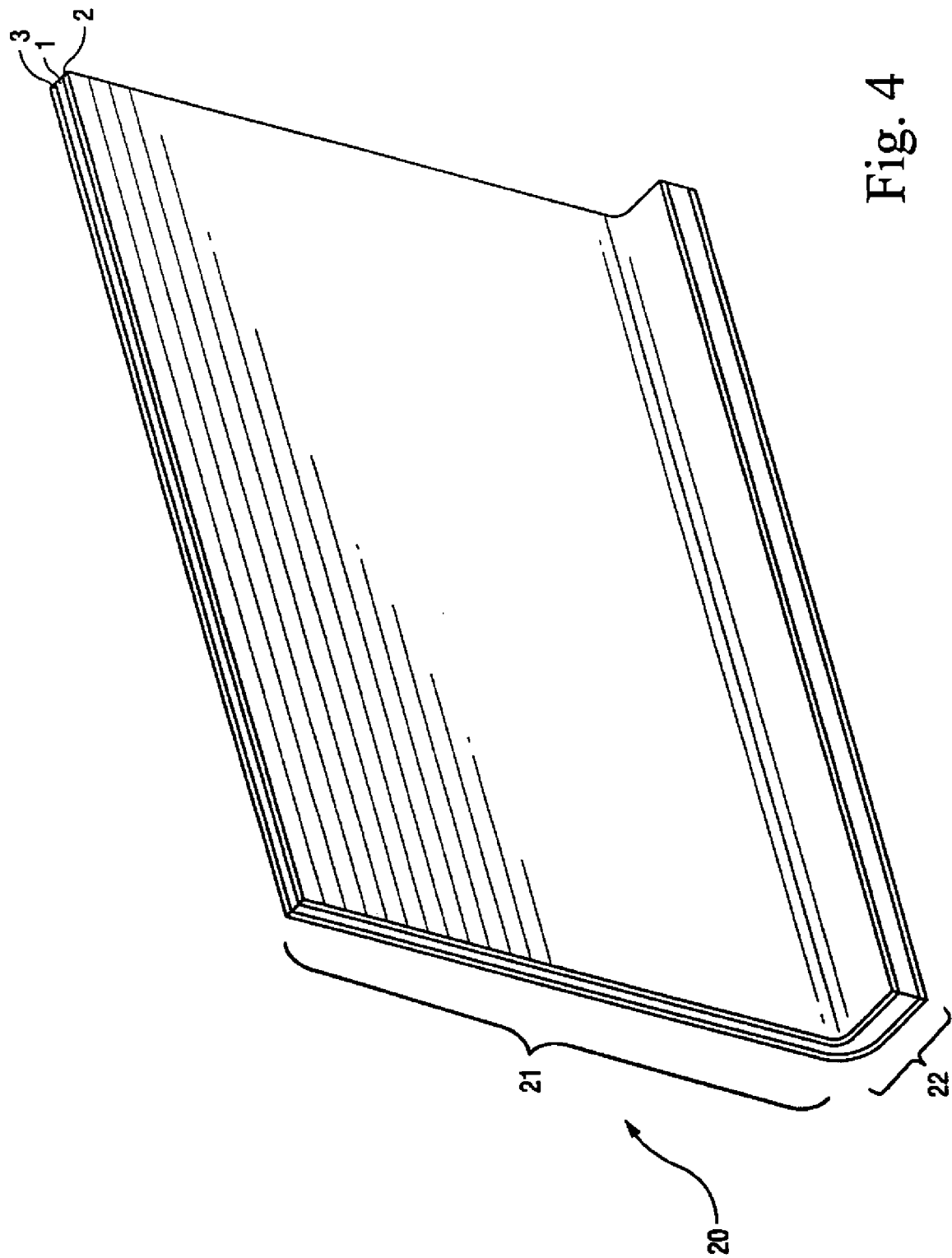
FIG. 4 is a perspective view of the rotor slot armor component illustrated in FIGS. 2 and 3.

FIGS. 2–4 illustrate details of the shape and configuration of rotor slot armor component 20, although it will be understood that identical comments apply to rotor slot armor component 25. Leg portion 22 of rotor slot armor component 20 has a composite thickness that is greater than the composite thickness of leg portion 21. That is, thickness $t_{22}$ is greater than $t_{21}$. Leg portions 21 and 22 are connected to each other at a portion of rotor slot armor component which has rounded edges defined by radiuses R1 and R2. Leg portions 21 and 22 extend perpendicularly to each other.

Rotor slot armor component 20 comprises a plurality of profile co-extruded polymer layers. In particular, rotor slot armor component 20 comprises three profile co-extruded polymer layers 1–3. Polymer layer 1 is sandwiched between outer polymer layers 2 and 3. Rotor slot armor component 25 comprises three profile co-extruded polymer layers 1a–3a. Polymer layer 1a is sandwiched between outer polymer layers 2a and 3a.

Outer polymer layers 2 and 3 have a uniform thickness. That is, the thickness of outer polymer layer 2 is uniform in both leg portions 21 and 22. Similarly, outer polymer layer 3 has a uniform thickness in both leg portions 21 and 22.

In contrast to outer polymer layers 2 and 3, polymer layer 1 has a non-uniform thickness. In particular, the thickness of polymer layer 1 in short leg portion 22 is greater than its thickness in leg portion 21. Because the thickness of polymer layer 1 in leg portion 22 is greater than that in leg portion 21, the composite thickness $t_{22}$ of leg portion 22 is greater than the composite thickness $t_{21}$ of leg portion 21.

Polymer layers 1–3 are chemically bonded together through a profile co-extrusion process. Polymer layers 1–3 are thus chemically bonded together through a melt stage of the profile co-extrusion process so that no adhesive is needed for bonding at the interfaces between polymer layers 1 and 2 and polymer layers 1 and 3. A rotor slot armor component having a monolithic structure (i.e., a uniform composition layer) typically has a high mechanical strength. However, a rotor slot armor component having a monolithic structure has a tendency to propagate cracks in the structure very quickly. In particular, if a crack in the monolithic structure forming the rotor slot armor component starts, the crack will often quickly propagate down the length of the rotor slot armor component. For example, if a rotor slot armor component has a L-shape, a crack that has started in the structure will often propagate very quickly down the length of the L-shape because there is essentially nothing to stop it.

Rotor slot armor components comprising multiple laminate layers are known. If a crack in one of the multiple laminate layers starts, the crack will not easily propagate into an adjacent laminate layer. Accordingly, crack propagation may be reduced. However, a rotor slot armor component having multiple laminated layers has low mechanical strength. A rotor slot armor component comprising multiple laminate layers will therefore break very easily.

Since rotor slot armor component 20 of the present invention includes a plurality of profile co-extruded layers, rotor slot armor component 20 will reduce crack propagation (as compared with a monolithic layer). A crack which starts in, for example, one of outer polymer layers 2 and 3, will not easily propagate into polymer layer 1 or down the axial length of the L-shaped profile of rotor slot armor component 20. Also, since layers 1–3 of rotor slot armor component 20 are profile co-extruded together, the composite material has a high mechanical strength and will thus not break easily. Accordingly, rotor slot armor component 20 having profile co-extruded layers 1–3 is both resistant to crack propagation and still mechanically strong. Outer polymer layers 2 and 3 are formed by a lower filled (e.g., lower glass-fill) polymer than the (more highly filled) middle layer 1. Lower filled outer polymer layers 2 and 3 are placed on the outside of the more highly filled middle polymer layer 1 because their crack sensitivity is reduced as compared to the more highly filled middle polymer layer 1. The more highly filled middle polymer layer 1 is mechanically more robust but more sensitive to cracking. Therefore, in addition to reducing crack propagation because of the multi-layer structure, outer layers 2 and 3 protect against crack initiation and middle layer 1 provides great mechanical strength.

While any high temperature thermoplastic (Tg>200° C.) that is extrudable, thermoformable, injection-moldable or compression-moldable may be used to form profile co-extruded rotor slot armor component 20, the inventors have discovered that glass-filled Ultem, unfilled Ultem, glass-filled PEEK (polyetheretherketone) or unfilled PEEK provide favorable characteristics as layers in rotor slot armor component 20. In particular, the inventors have found that profile co-extruding a middle high temperature polymer layer 1 having a glass-fill less than or equal to 30% (0% <glass-fill ≦ 30%) sandwiched between two unfilled outer high temperature polymer layers 2 and 3 provide preferable mechanical, electrical and/or thermal properties for use as a rotor slot armor material. For example, the inventors have found that profile co-extruding a middle layer of Ultem having a glass-fill less than 30% (0% <glass-fill ≦ 30%) sandwiched between two unfilled Ultem layers or a PEEK middle layer having a glass-fill less than 30% (0% <glass-fill ≦ 30%) sandwiched between two unfilled PEEK layers provides preferable mechanical, electrical and/or thermal properties for use as a rotor slot armor material such as high flexural, flexural modulus, flexural strength, thermal endurance, impact resistance, thermal conductivity, dielectric strength, electrical creepage, and voltage impulse resistance, as well as improved water absorption, shrinkage and tensile creep and reduced crack propagation.

Figure 5:
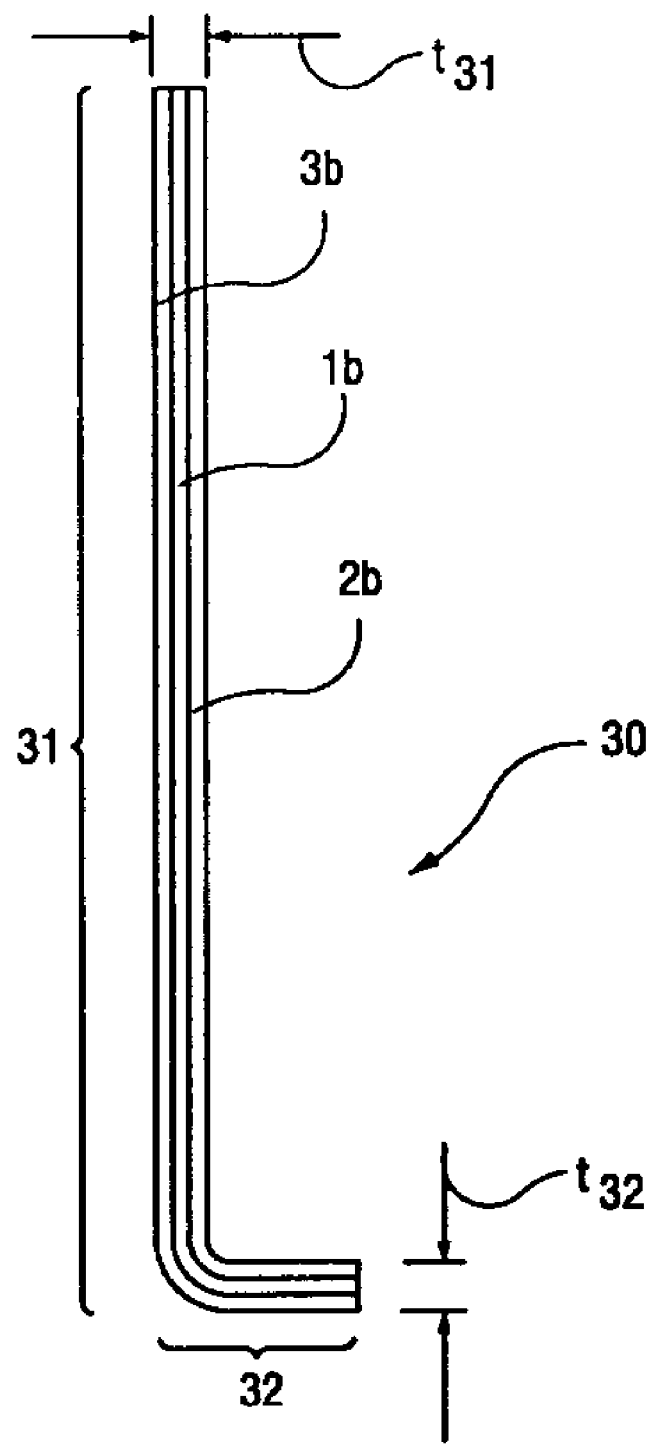
FIG. 5 is a side view of a rotor slot armor component in accordance with another exemplary embodiment of the present invention.
Figure 6:
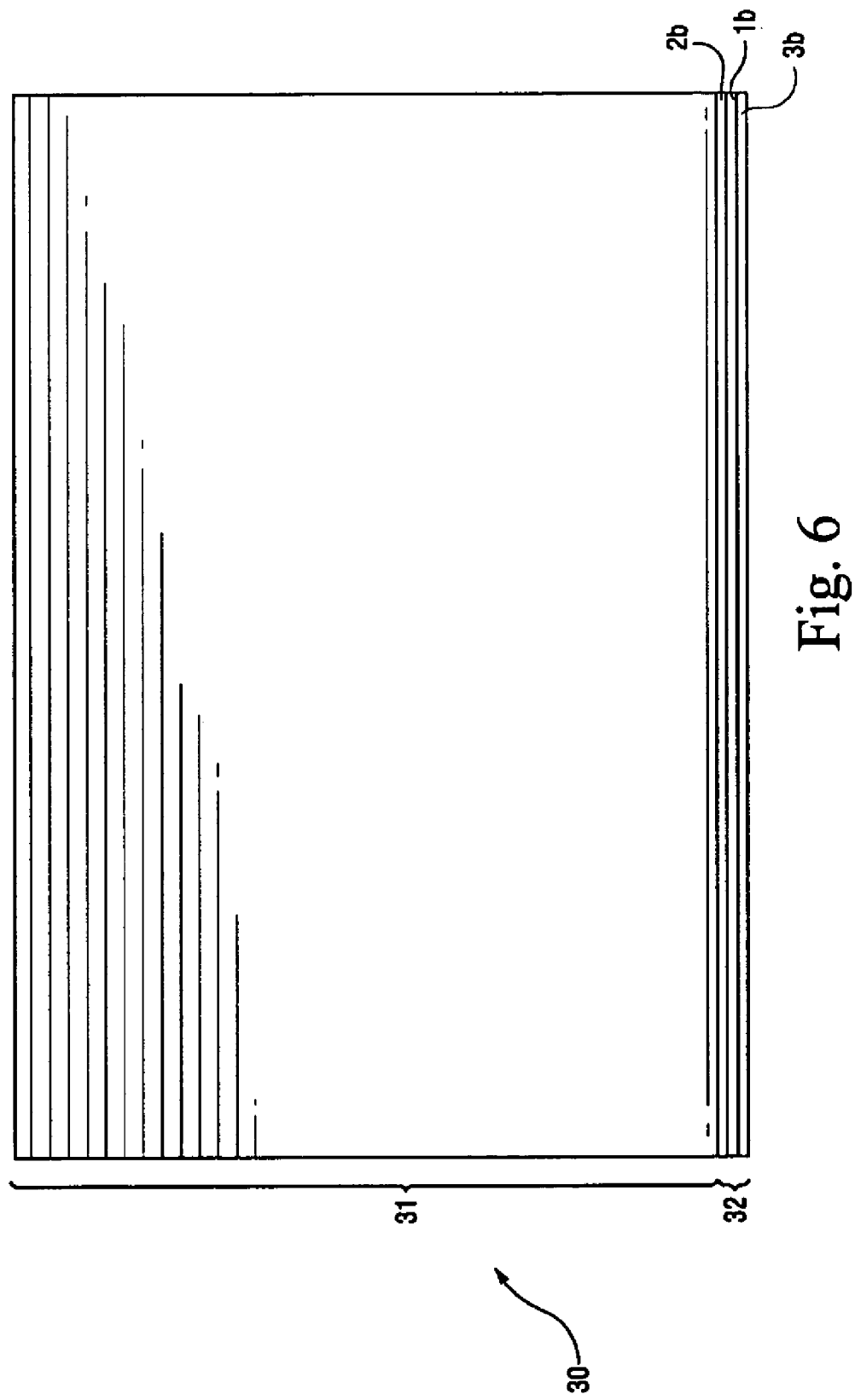
FIG. 6 is a front view of the rotor slot armor component illustrated in FIG. 5.
Figure 7:
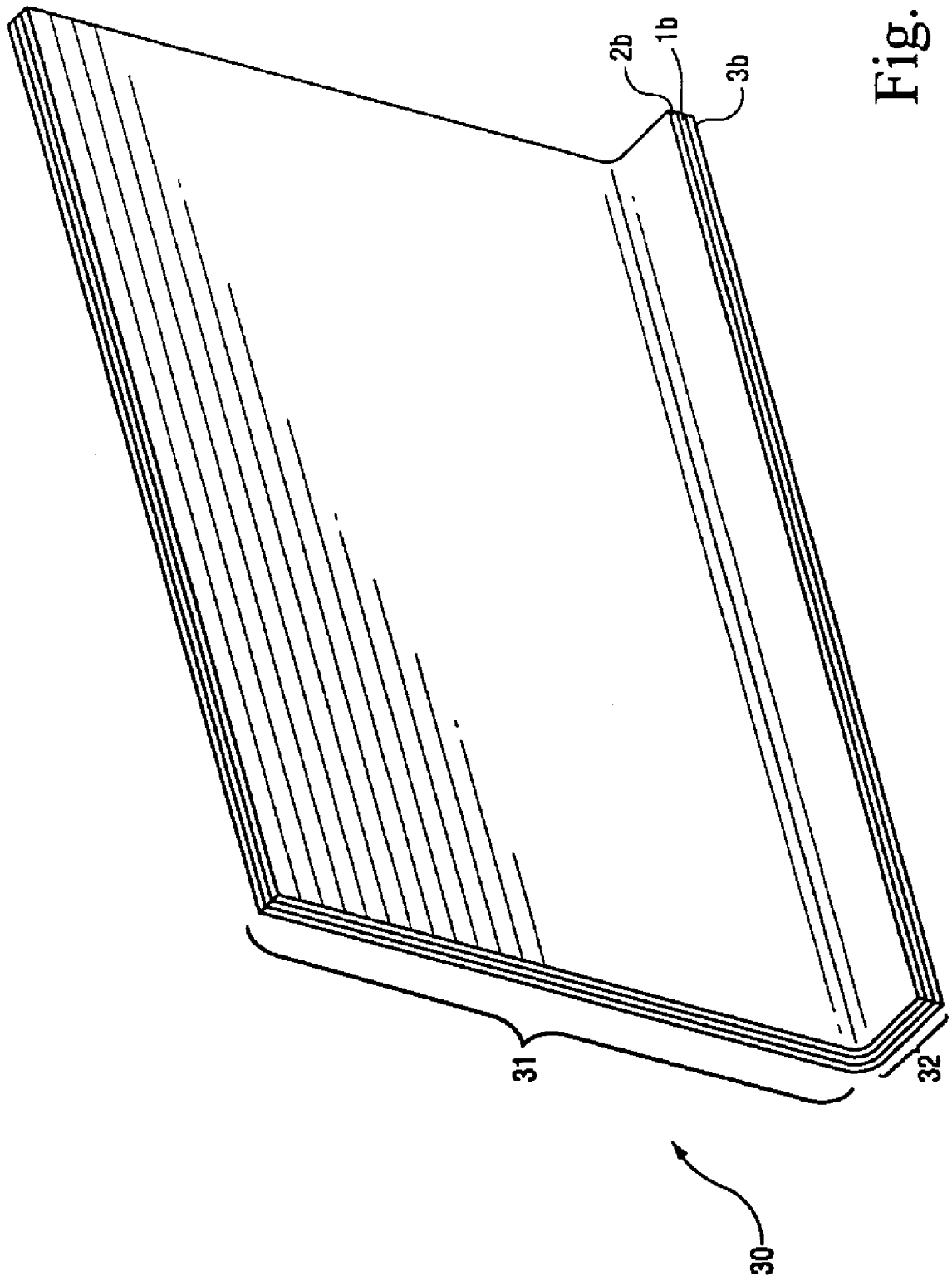
FIG. 7 is a perspective view of the rotor slot armor component illustrated in FIGS. 5 and 6.

FIGS. 5–7 illustrate details of the shape, components and configuration of rotor slot armor component 30 in accordance with another exemplary embodiment of the present invention. Rotor slot armor component 30 includes long leg portion 31 and short leg portion 32 disposed perpendicularly to long leg portion 31. Rotor slot armor component 30 formed by a profile co-extrusion process and includes profile co-extruded high temperature polymer layers 1b–3b. Each of the polymer layers 1b–3b has a uniform thickness. That is, each of polymer layers 1b–3b has a uniform thickness in both leg portions 31 and 32. The composite thickness $t_{32}$ of short leg portion 32 is therefore equal to the composite thickness $t_{31}$ of long leg portion 31.

Figure 8:
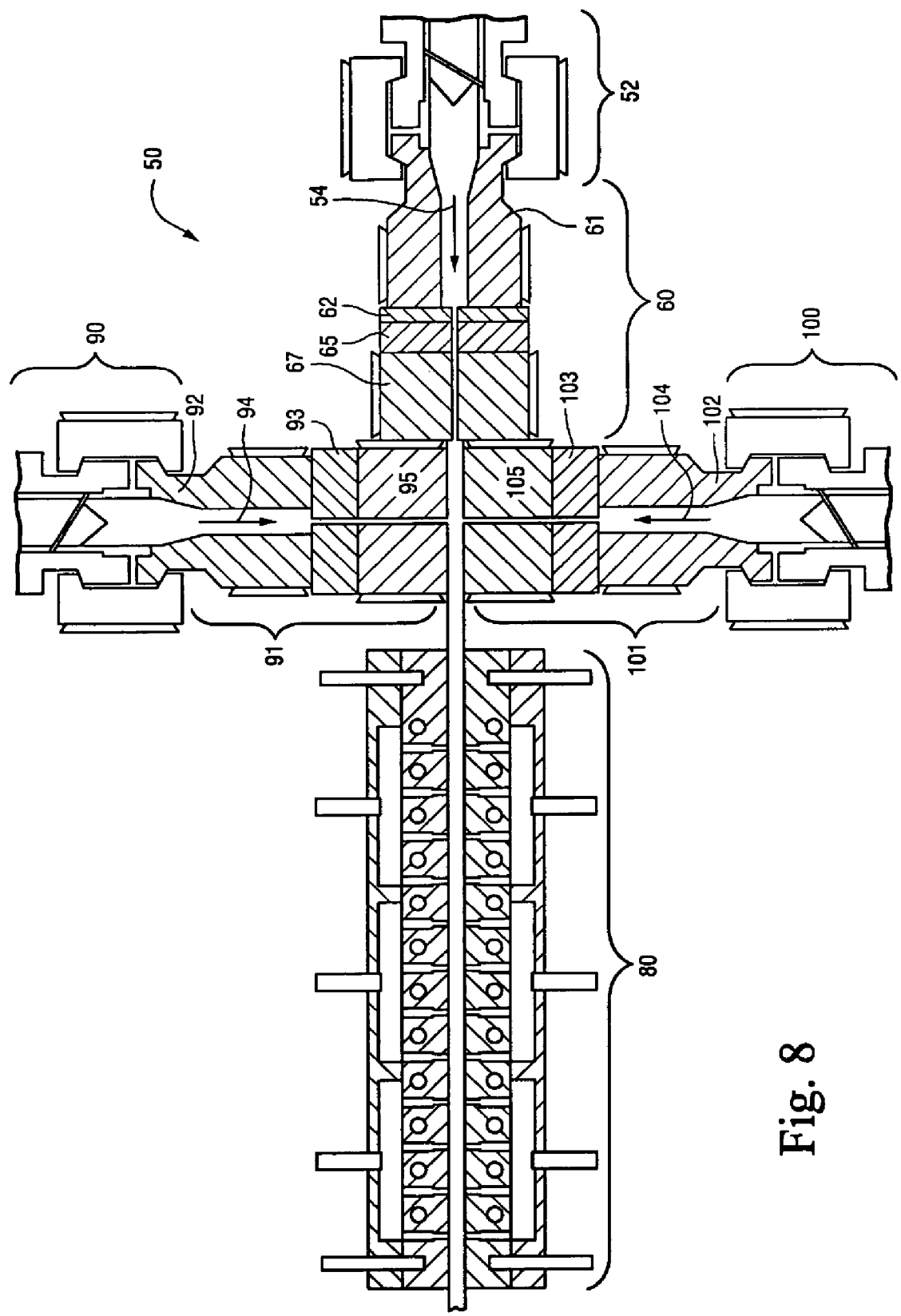
FIG. 8 is a schematic diagram of a multiple layer profile co-extrusion system in accordance with an exemplary embodiment of the present invention.

FIG. 8 is a schematic diagram of a profile co-extrusion system 50 for processing materials to form the multi-layered profile co-extruded rotor slot armor component 20 (or component 30) in accordance with an exemplary embodiment of the present invention. Materials processed by profile co-extrusion system 50 flow in the directions indicated by arrows 54, 94 and 104. Profile co-extrusion system 50 includes an extruder 52, die 60, extruder 100, die 101, extruder 90, die 91 and calibrator 80. Die 60 includes a die reservoir 61, spider plate 62, pre-land 65 and land 67. Die 91 includes die reservoir 92, flow channel 93 and land 95. Die 101 includes die reservoir 102, flow channel 103 and land 105.

In operation, extruder 52 receives raw materials such as pellets of raw high temperature (Tg>200Â° C.) polymer and optionally a powder of filler material such as glass (e.g., chopped glass fiber or glass beads) in a hopper. The raw material may be, for example, Ultem or PEEK. A screw element(s) arranged within a barrel of extruder 52 is rotated in order to mix the raw materials. The mixture of raw materials may be, for example, an Ultem or PEEK material having a glass-fill of 30% or less (i.e., 0% <glass-fill â‰¤ 30%). While being conveyed through the barrel of extruder 52, the raw materials are heated so that they are transformed from a solid state into a molten state. The molten material is then conveyed and forced at high pressure through die 60. In particular, the molten material is conveyed through die reservoir 61 to spider plate 62.

Figure 9:
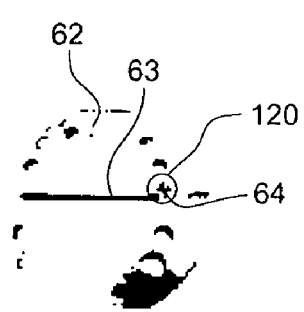
FIG. 9 is a front view of an exemplary spider plate of the profile co-extrusion system illustrated in FIG. 8.

FIG. 9 illustrates a front view of an exemplary spider plate 62. Spider plate 62 includes a number of slots through which the molten material may pass. These slots include a long thin slot 63 and a cross-shaped slot 64. The molten material passing through slots 63 and 64 of spider plate 62 is conveyed to pre-land 65.

Figure 10:
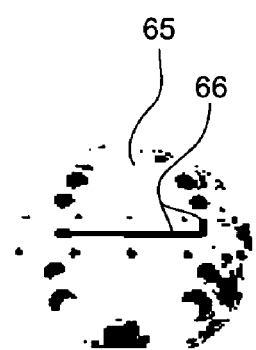
FIG. 10 is a front view of an exemplary pre-land plate of the profile co-extrusion system illustrated in FIG. 8.

FIG. 10 illustrates a front view of an exemplary pre-land 65. Pre-land 65 includes a slot 66 which provides shaping to the molten material passing therethrough. Specifically, material passing through slots 63 and 64 of spider plate 62 is conveyed through slot 66 of pre-land 65. After passing through slot 66 of pre-land 65, the molten material is conveyed to land 67.

Figure 11:
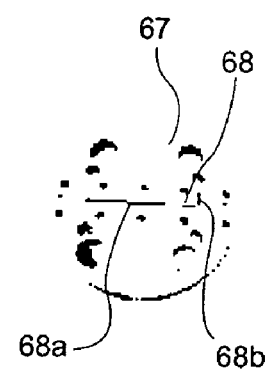
FIG. 11 is a front view of an exemplary land plate of the profile co-extrusion system illustrated in FIG. 8.

FIG. 11 illustrates a front view of an exemplary land 67. Land 67 includes a slot 68 which provides a final profile shape to the molten material. Specifically, slot 68 includes a long thin slot portion 68a and a short wide slot portion 68b arranged at an angle to slot portion 68a so that molten material passing through slot 68 will have an L-shaped profile. This L-shaped profile extruded material forms the polymer layer (i.e., polymer layer 1) of rotor slot armor component 20 which will later be co-extruded between outer polymer layers 2 and 3.

It is beneficial for the material forming polymer layer 1 to exit land 67 at a substantially uniform rate. For example, it is beneficial for the flow rate of the material exiting slot portion 68a to match the flow rate of the material exiting slot portion 68b so that the molten material exiting slot 68 will not twist or bend over (after exiting land 67). If the respective flow rates of the material exiting slot portions 68a and 68b are not uniform, the material may bend and twist over after leaving slot 68 and thus the desired profile-extruded shape of polymer layer 1 will not be obtained.

Because the dimensions of slot portion 68a are different than the dimensions of slot portion 68b, the molten material exiting these respective slot portions will tend to flow at different rates. In particular, the flow resistance offered by wide slot portion 68b is less than that offered by thin slot portion 68a. If an unregulated amount of molten material was provided to slot 68, the material may not completely fill up and flow out of thin slot portion 68a. The flow rate of material exiting thin slot portion 68a would therefore be slower than the flow rate of material exiting wide slot portion 68b because the flow resistance provided by thin slot 68a is greater than that offered by wide slot 68b. Because the respective flow rates are non-uniform, the material forming polymer layer 1 may bend and twist after leaving slot 68 of land 67 and thus the desired profile shape of polymer layer 1 would not be obtained.

In order to ensure that the respective flow rates from slot portions 68a and 68b are uniform, additional flow resistance must be provided to that portion of the material that will pass through slot portion 68b. That is, the flow of molten material provided to wide slot portion 68b must be slowed (or the flow rate of material provided to slot portion 68a must be increased) so that the flow rate of material exiting from all portions of slot 68 (e.g., slot portions 68a and 68b) is uniform.

In order to slow the flow rate of material exiting slot portion 68b, the of material being provided to slot portion 68b is slowed. The flow rate of material being provided to slot portion 68b may be slowed through the use of spider plate 62 which is located upstream from land 68.

Figure 12:
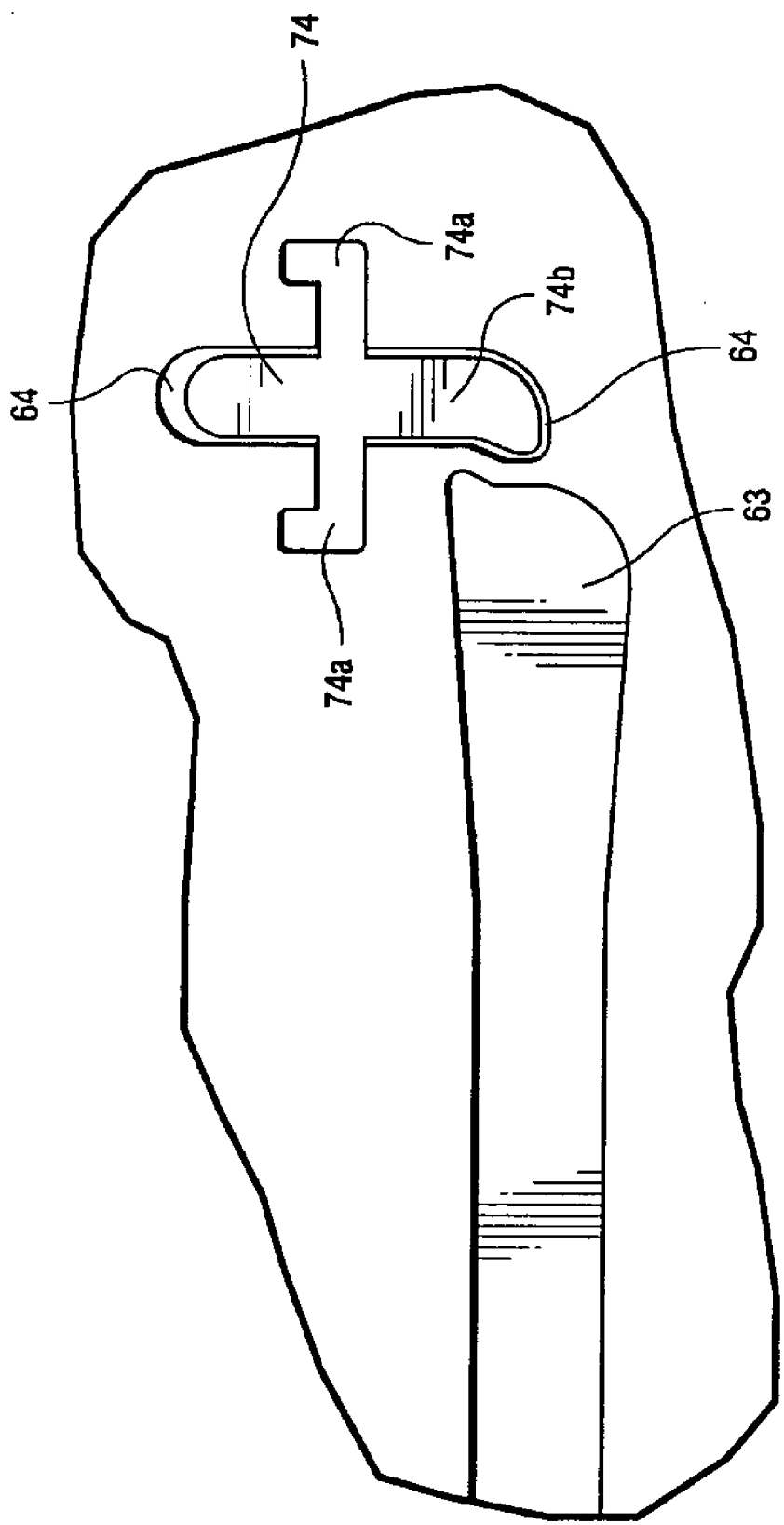
FIG. 12 is a view showing details of a portion of the exemplary spider plate illustrated in FIG. 9 which is encircled by circle 120.

FIG. 12 illustrates details of a portion of spider plate 62. Spider plate 62 includes slot 64. At least some of the material passing through slot 64 of spider plate 62 will ultimately be provided to slot portion 68b. That is, slot 64 and slot portion 68b are positioned so that at least some of the material exiting slot 64 ultimately enters slot portion 68b via slot 66 of pre-land 65. By controlling the flow rate of material passing through slot 64 of spider plate 62 (upstream of land 67), the flow rate of material entering slot 68b may be controlled and thus the flow rate of material exiting slot 68b to form polymer layer 1 may be controlled.

As can be seen in detail from FIG. 12, mandrel 74 is inserted and held in slot 64 of spider plate 64. Specifically, mandrel 74 includes two horizontally-extending arms 74a which are inserted tightly in a correspondingly shaped portion of slot 64 so that mandrel 74 is held within slot 64. The two arms 74a extend from a body portion 74b of mandrel 74. The dimensions on the top, bottom and lateral sides of body portion 74b, however, are not as extensive as the corresponding portions of slot 64. Accordingly, slot 64 still contains openings (e.g., see the top and the bottom portions of slot 64) through which molten material may pass. The rate at which molten material passes through slot 64 is controlled by the size of body portion 74b. For example, in order to increase the flow rate through slot 64, the size of the top and bottom portions of body portion 74b can be decreased so that the flow openings defined in slot 64 will be larger.

The position of slot 64 having mandrel 74 inserted therein is aligned with slot portion 68b of land 67. Slot 63 of spider plate 62 is aligned with slot portion 68a of land 67. At least some of the molten material originating from slot 63 of spider plate 62 will therefore pass through slot 66 of pre-land 65 and then to slot portion 68a of land 67. However, the flow rate of material exiting from slot 64 is restricted by mandrel 74 (body portion 74b in particular) so that the flow rate of material exiting from slot 64 will be slowed even before it reaches slot portion 68b. Since the flow of material reaching slot portion 68b is slowed, the flow rate of material exiting slot portion 68b will be slowed. The flow rate of material flowing out of slot portion 68b can thus be slowed so that it matches the flow rate of material exiting slot portion 68a. A uniform flow velocity of material exiting slot portions 68a and 68b may therefore be obtained. Undesired twisting and deformation of the molten material exiting slot 68 may therefore be avoided and the desired profile shape of polymer layer 1 may be obtained.

Figure 14:
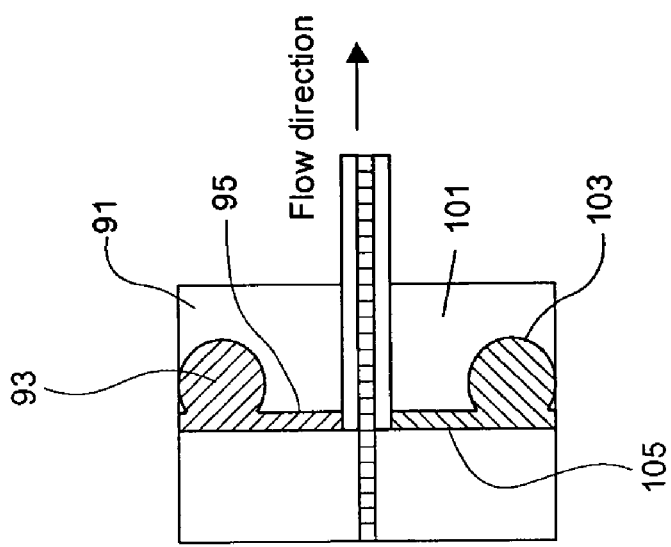
FIG. 14 is a partial cross-sectional view indicated by line 14—14 in FIG. 13.
Figure 13:
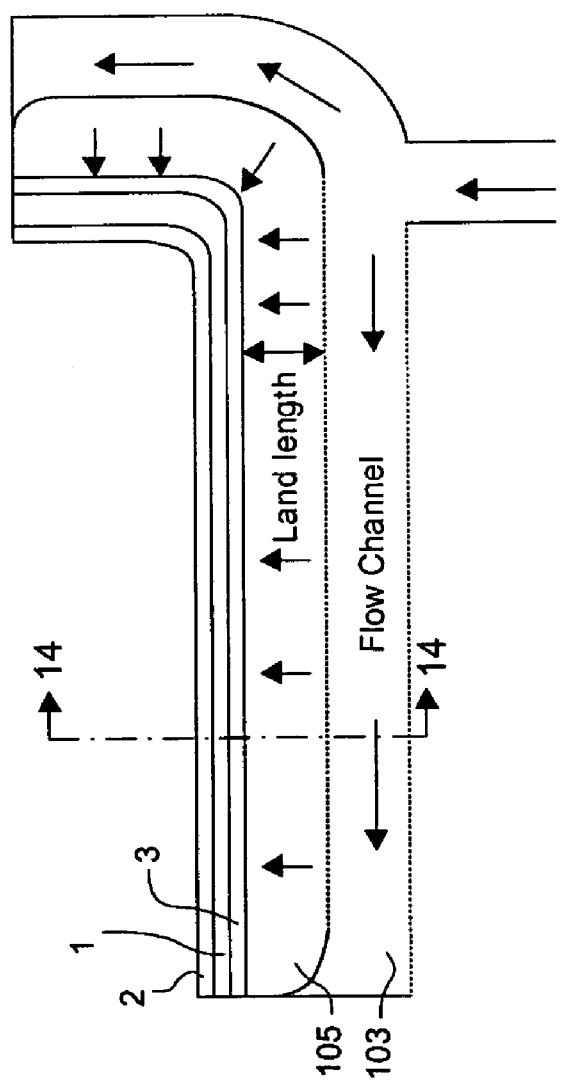
FIG. 13 is a partial cross-sectional view of the multiple layer profile co-extrusion system illustrated in FIG. 8.

FIGS. 8 and 13–14 illustrate co-extruding outer polymer layers 2 and 3 onto opposite sides of polymer layer 1. For clarity, only details of die 101 are illustrated in FIG. 13 for applying outer polymer layer 3 onto polymer layer 1. However, those skilled in the art will appreciate that a similar details would apply to die 91 for applying outer polymer layer 2 onto the opposite side of polymer layer 1.

Extruders 90 and 100 each receives raw materials such as pellets of raw high temperature polymer and optionally a powder of filler material such as glass in a hopper. The raw material may be, for example, Ultem or PEEK without any glass-fill. The respective raw materials, which may be the same or different from each other, are conveyed through respective barrels of extruders 90 and 100. While being conveyed through extruders 90 and 100, the respective raw materials are heated so that they are transformed from a solid state into a molten state. The molten material from extruder 90 is conveyed and forced at high pressure through die 91. In particular, the molten material from extruder 90 is first conveyed through die reservoir 92 to flow channel 93 as indicated by arrow 94. Similarly, the molten material from extruder 100 is conveyed and forced at high pressure through die 101. In particular, molten material from extruder 100 is first conveyed through die reservoir 102 to flow channel 103 as indicated by arrow 104.

Flow channels 93 and 103 pass the molten materials to lands 95 and 105, respectively. Flow channels 93 and 103 provide some profile shaping to the respective molten materials received. Flow channels 93 and 103 provide a low flow resistance and an almost uniform pressure to the respective molten materials. Lands 95 and 105 provide further profile shaping to the respective molten materials and offer a pressure gradient (pressure drop) via the length of the lands. Lands 95 and 105 also provide a higher flow resistance to the respective molten materials received. The length of lands 95 and 105 may be adjusted to adjust the flow velocity of the molten materials output from the lands 95 and 105. For example, a longer land length will provide a greater amount of flow resistance and thus reduce the flow velocity of the molten material passing therethrough. Since polymer layer 2 has an L-shaped profile which is smaller than the L-shaped profile of polymer layer 3, the flow resistances provided by lands 95 and 105 must be different.

As illustrated in FIG. 14, profile extruded polymer layer 1 exiting land 67 is received by dies 91 and 101. A profile extruded polymer layer 2 having a smaller L-shaped profile is applied to one side of polymer layer 1 via die 91. A profile extruded polymer layer 3 having a larger L-shaped profile is applied to the opposite side of polymer layer 1 via die 101. The flow rate of polymer layer 2 is controlled by the length of land 95 of die 91 so that it matches the flow rate at which polymer layer 1 enters die 91. Polymer layer 2 is therefore evenly applied to one side of polymer layer 1. The flow rate of polymer layer 3 is controlled by the length of land 105 of die 101 so that it matches the flow rate at which polymer layer 1 enters die 101. Polymer layer 3 is therefore evenly applied to the other side of polymer layer 1 on which polymer layer 2 is applied. The three polymer layers 1–3 are heated so that they are chemically bonded together without the need for adhesive at the interfaces between polymer layers 1 and 2 and polymer layers 1 and 3. The composite profile co-extruded rotor slot armor component 20 comprising layers 1–3 then exits dies 91 and 101. The profile co-extruded rotor slot armor component 20 enters calibrator 80. Calibrator 80 cools the profile co-extruded layers and fine tunes the dimensions and then outputs profile co-extruded rotor slot armor component 20.

By utilizing the profile co-extrusion manufacturing process, rotor slot armor components having multiple polymer layers can be formed in a large variety of shapes and thicknesses. For example, the L-shaped profile of rotor slot armor components 20, or 30 may be formed to accurate and precise dimensions. Utilizing the profile co-extrusion process to manufacture the rotor slot armor components also enables these components to have a relatively high flexural modulus, flexural strength, angular strength, electrical creepage and dielectric strength. For example, since the multiple layers are chemically bonded together by a profile co-extrusion process, the rotor slot armor component has a high mechanical strength. Moreover, crack propagation may be avoided. The properties of the materials formed using a profile co-extrusion process also provides a lower moisture absorption, high dielectric strength and electrical creepage as well as improved solvent resistance. This improved solvent resistance reduces electrical failures due to chemical contamination of the profile co-extruded materials forming the rotor slot armor component.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A slot armor component for use in a rotor of a dynamo-electric machine, the slot armor component comprising a plurality of profile co-extruded polymer layers;
   wherein a composite cross-section of the profile co-extruded layers includes a first leg portion and a second leg portion disposed at an angle to the first leg portion, the second leg portion being shorter and thicker than the first leg portion.

2. A slot armor component for use in a rotor of a dynamo-electric machine, the slot armor component comprising a plurality of profile co-extruded polymer layers;
   wherein the plurality of profile co-extruded polymer layers includes a first polymer layer having a first glass-fill concentration and a second polymer layer arranged on one side of the first polymer layer having a second glass-fill concentration which is lower than the first glass-fill concentration.

3. A slot armor component as in claim 2 wherein the plurality of profile co-extruded polymer layers further includes a third polymer layer having a third glass-fill concentration which is lower than the first glass-fill concentration, the third polymer layer being arranged on an opposite side of the first polymer layer on which the second polymer layer is arranged.

4. A slot armor component for use in a rotor of a dynamo-electric machine, the slot armor component comprising a plurality of profile co-extruded polymer layers;
   wherein the plurality of co-extruded polymer layers includes a glass-filled polymer layer arranged between two unfilled polymer layers.

5. A slot armor component as in claim 4 wherein the glass-filled polymer layer is a glass-filled Ultem layer, the glass-filled Ultem having a glass-fill concentration equal to or less than 30%.

6. A slot armor component as in claim 5 wherein the two unfilled polymer layers each comprises an unfilled Ultem layer.

7. A slot armor component as in claim 4 wherein the glass-filled polymer layer is a glass-filled polyetheretherketone (PEEK) layer, the glass-filled PEEK having a glass-fill concentration equal to or less than 30%.

8. A slot armor component as in claim 7 wherein the two unfilled polymer layers each comprises an unfilled PEEK layer.

9. A slot armor component for use in a rotor of a dynamo-electric machine, the slot armor component comprising a plurality of profile co-extruded polymer layers;
   wherein the plurality of profile co-extruded polymer layers includes a first polymer layer having a non-uniform thickness and a second polymer layer having a uniform thickness.

10. A slot armor component for use in a rotor of a dynamo-electric machine, the slot armor component comprising a plurality of profile co-extruded polymer layers;
   wherein the plurality of profile co-extruded polymer layers includes a first polymer layer having a non-uniform thickness and a second polymer layer having a uniform thickness; and
   the plurality of profile co-extruded polymer layers further includes a third polymer layer, the third polymer layer having a uniform thickness, and wherein the first polymer layer is arranged between the second and third polymer layers.

* * * * *